(12) United States Patent
Nakao et al.

(10) Patent No.: US 9,094,848 B2
(45) Date of Patent: Jul. 28, 2015

(54) BASE STATION APPARATUS AND TRANSMISSION CONTROL METHOD

(75) Inventors: Seigo Nakao, Kanagawa (JP); Koji Yamamoto, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 302 days.

(21) Appl. No.: 13/816,786

(22) PCT Filed: Aug. 23, 2010

(86) PCT No.: PCT/JP2010/005184
§ 371 (c)(1),
(2), (4) Date: Feb. 13, 2013

(87) PCT Pub. No.: WO2012/025952
PCT Pub. Date: Mar. 1, 2012

(65) Prior Publication Data
US 2013/0143545 A1    Jun. 6, 2013

(51) Int. Cl.
*H04M 3/00* (2006.01)
*H04W 24/02* (2009.01)
(Continued)

(52) U.S. Cl.
CPC ............ *H04W 24/02* (2013.01); *H04W 52/244* (2013.01); *H04W 72/0426* (2013.01); *H04W 72/082* (2013.01); *H04W 16/32* (2013.01); *H04W 52/143* (2013.01)

(58) Field of Classification Search
USPC ......... 455/418, 452.1, 522, 69; 370/210, 330, 370/323, 230, 395, 231, 232, 233, 234, 235, 370/397, 428, 429, 329, 332, 331, 474, 473, 370/389
See application file for complete search history.

(56) References Cited

U.S. PATENT DOCUMENTS 5,974,033 A * 10/1999 Kamiya et al. ............. 370/230.1
2002/0191643 A1 * 12/2002 Yun et al. ..................... 370/474
(Continued)

FOREIGN PATENT DOCUMENTS

EP       2180739 A1     4/2010
JP       2009-89361 A   4/2009
(Continued)

OTHER PUBLICATIONS

3GPP TS 36.211 V9.1.0, "Physical Channels and Modulation (Release 9)," May 2010.
(Continued)

*Primary Examiner* — Charles Appiah
*Assistant Examiner* — Alexander Yi
(74) *Attorney, Agent, or Firm* — Pearne & Gordon LLP

(57) ABSTRACT

A base station apparatus, when performing the transmission controls of pico base stations, can perform an appropriate transmission control for each pico base station, while suppressing the increase of the amount of feedback information from a macro terminal to a macro base station and also suppressing the increase of the amount of transmission control information from the macro base station to the pico base station. In this apparatus, a transmission control unit (102) updates, on the basis of the control information, the priority level of each of a plurality of different correspondences in which the respective ones of transmission control guidelines are associated with the respective ones of a plurality of control information history patterns, and controls the transmissions on the basis of the control guidelines determined from the control information histories and the correspondences each having a respective higher priority level.

11 Claims, 9 Drawing Sheets

| $\mu[k-1]$, $\mu[k]$ | STRATEGY "a" | STRATEGY "b" | STRATEGY "c" |
|---|---|---|---|
| −1, −1 | TRANSMISSION + | TRANSMISSION − | TRANSMISSION − |
| −1, +1 | TRANSMISSION − | TRANSMISSION + | TRANSMISSION − |
| +1, −1 | TRANSMISSION + | TRANSMISSION − | TRANSMISSION + |
| +1, +1 | TRANSMISSION − | TRANSMISSION + | TRANSMISSION + |
| PRIORITY | a[k] | b[k] | c[k] |

HISTORY

USE STRATEGY HAVING THE HIGHEST PRIORITY AT EACH TIME

(51) Int. Cl.
  *H04W 72/04* (2009.01)
  *H04W 72/08* (2009.01)
  *H04W 52/24* (2009.01)
  *H04W 16/32* (2009.01)
  *H04W 52/14* (2009.01)

(56) References Cited

U.S. PATENT DOCUMENTS

2009/0088176 A1* 4/2009 Teo et al. .................. 455/452.1
2012/0250636 A1* 10/2012 Wang et al. ................ 370/329

FOREIGN PATENT DOCUMENTS

| JP | 2010-124462 A | 6/2010 |
|----|---------------|--------|
| JP | 2010-177922 A | 8/2010 |

OTHER PUBLICATIONS

3GPP TS 36.212 V9.2.0, "Multiplexing and channel coding (Release 9)," Jun. 2010.
3GPP TS 36.213 V9.2.0, "Physical layer procedures (Release 9)," Jun. 2010.
Seigo Nakao, Tomofumi Takata, Daichi Imanura, and Katsuhiko Hiramatsu, "Performance enhancement of E-UTRA uplink control channel in fast fading environments," Proceeding of IEEE VTC 2009 spring, Apr. 2009.
Koji Yamamoto, et al., Performance Evaluation of Minority Game-based Self-Organized Interference Management, The Institute of Electronics, Information and Communication Engineers, IEICE Technical Report, SR2009-106 (Mar. 2010).
Kazuya Kimura, et al., Study of Self-organized Interference Management for Spectrum Sharing Minority Game-based Approach, The Institute of Electronics, Information and Communication Engineers, IEICE Technical Report, SR2009-72, AN2009-42, USN2009-45(Oct. 2009).
3GPP TSG RAN WG1 Meeting #48, R1-070870, St. Louis, USA, Feb. 12-16, 2007, NTT DoCoMo, NEC, Panasonic, Sharp, Toshiba Corporation, Transmission Power Control in E-UTRA Uplink.
3GPP TSG RAN WG1 #47, R1-063478, Nov. 6-10, 2006, Lucent Technologies, Uplink Scheduling with Inter-Cell Power Control, with Extensions to Interference Coordination.
3GPP TSG RAN WG1 #47, R1-063446, Nov. 6-10, 2006, Riga, Latvia, Qualcomm Europe, Analysis of Inter-cell Power Control for Interference Management in E-UTRA UL.
International Search Report for PCT/JP2010/005184 dated Nov. 22, 2010.

* cited by examiner

| HISTORY LENGTH M:6 $\mu[k-5], \mu[k-4], \cdots, \mu[k]$ | STRATEGY a | STRATEGY b | STRATEGY c |
|---|---|---|---|
| −1, −1, −1, −1, −1, −1 | TRANSMISSION + | TRANSMISSION − | TRANSMISSION − |
| −1, −1, −1, −1, −1, +1 | TRANSMISSION − | TRANSMISSION + | TRANSMISSION − |
| −1, −1, −1, −1, +1, −1 | TRANSMISSION + | TRANSMISSION − | TRANSMISSION + |
| ... | ... | ... | ... |
| PRIORITY | a[k] | b[k] | c[k] |

FIG.8

BASE STATION APPARATUS AND TRANSMISSION CONTROL METHOD

TECHNICAL FIELD

The present invention relates to a base station apparatus and a method of controlling transmission.

BACKGROUND ART

A heterogeneous network is attracting attention in current 3GPP-LTE (3rd generation partnership project radio access network long term evolution) (see, for example, Non-Patent Literature 1, 2, 3, and 4).

The heterogeneous network employs not only "a macro base station (a macro cell)" (it may be referred to as a large cell base station) but also "a pico base station (a pico cell)" (it may be referred to as a small cell base station) in order to respond to an increased capacity in a cellular network. The macro base station covers a large area (for example, a coverage area having a cell radius of several kilometers) and the pico base station covers a small area (for example, a coverage area having a cell radius of several tens of meters).

As shown in FIG. 1, one or more pico base stations ("Pico" shown in FIG. 1) are allocated in a service area for the macro base station ("Macro" shown in FIG. 1) in the heterogeneous network, for example. The macro base station covers a larger service area than the pico base station, and is therefore effective for the improvement of an area cover ratio. Meanwhile, the pico base station covers a service area smaller than that of the macro base station, and therefore allows a distance, at which the same frequency (a frequency reuse distance) can be reused, to be shorter. Thus, a larger number of cells can be allocated in a certain area to effectively improve the use efficiency of a frequency. Accordingly, the heterogeneous network is directed to allow both a high area cover rate and a high use efficiency of a frequency through complementary allocation of the macro base station and the pico base station.

A base station which connects with only a group of terminals (a closed subscriber group) having an access right in advance may be distinguished from the pico base station and be referred to as "a femto base station (a femto cell)" among base stations covering small cells as a coverage area. For simplicity of explanation, the pico base station and the femto base station are simply represented as "a pico base station" without distinguishing the pico base station and the femto base station in the following explanation.

CITATION LIST

Non-Patent Literature

NPL 1
3GPP TS 36.211 V9.1.0, "Physical Channels and Modulation (Release 9)," May 2010
NPL 2
3GPP TS 36.212 V9.2.0, "Multiplexing and channel coding (Release 9)," June 2010
NPL 3
3GPP TS 36.213 V9.2.0, "Physical layer procedures (Release 9)," June 2010
NPL 4
Seigo Nakao, Tomofumi Takata, Daichi Imanura, and Katsuhiko Hiramatsu, "Performance enhancement of E-UTRA uplink control channel in fast fading environments," Proceeding of IEEE VTC 2009 spring, April. 2009

SUMMARY OF INVENTION

Technical Problem

In the heterogeneous network, the macro base station and the pico base station may define a service area, using the same frequency. In this case, interference between the macro cell and the pico cell causes a problem in a downlink channel. As shown in FIG. 1, terminals (macro terminals (Macro UE)) connected to the macro base station receive interference (dotted arrows shown in FIG. 1) from the pico base stations located in the vicinity of the macro terminals in addition to a desired signal (a solid arrow shown in FIG. 1) from the macro base station, for example. For this reason, transmission control in the pico base station in a downlink channel has been studied in the heterogeneous network.

The above mentioned transmission control includes an increase and decrease in transmission power, an increase and decrease in transmission frequency, an increase and decrease in a frequency band used for transmission, but is simply referred to as "transmission control" in the following explanation.

In one of the methods for controlling transmission in the pico base station, the macro terminal feeds back individual information on interference received from each pico base station in a downlink channel to the macro base station, and the macro base station individually indicates transmission control to each pico base station based on the fed back information on interference for each pico base station. However, in this transmission control method, the macro terminal must individually report interference information for each pico base station to the macro base station, and additionally the macro base station must individually report a transmission control signal to each pico base station. Accordingly, an increase in overhead of transmission control causes a problem.

In another possible method for controlling transmission in the pico base station, the macro terminal feeds back information on a total sum of interference received from each pico base station in a downlink channel to the macro base station, and the macro base station uniformly indicates transmission control to all pico base stations based on the fed back interference information. However, this transmission control method can suppress an increase in overhead in transmission control, but cannot control transmission for each pico base station. This causes a problem that transmission control for each pico base station is not optimized.

Accordingly, in transmission control in the pico base station, a method is desirable which can appropriately control transmission for each pico base station while suppressing an increase in the amount of feed back information from the macro terminal to the macro base station and an increase in the amount of transmission control information from the macro base station to the pico base station.

It is an object of the present invention to provide a base station apparatus and a transmission control method which can appropriately control transmission for each pico base station while suppressing an increase in the amount of feed back information from a macro terminal to a macro base station and an increase in the amount of transmission control information from the macro base station to a pico base station in transmission control in the pico base station.

Solution to Problem

A base station according to an aspect of the present invention employs a configuration to include a receiving section that receives control information on interference among a plurality of terminal apparatuses from another base station apparatus in communication with the plurality of terminal apparatuses; and a control section that updates a priority in each of a plurality of different correspondences based on the control information, the correspondence being obtained by associating each of a plurality of history patterns consisting of control information with a control plan for transmission, and controls transmission based on the control plan identified with a history of the control information and the correspondence having the highest priority.

A method of controlling transmission according to an aspect of the present invention employs a configuration to include the steps of receiving control information on interference among a plurality of terminal apparatuses from another base station apparatus in communication with the plurality of terminal apparatuses; and updating a priority in each of a plurality of different correspondences based on the control information, the correspondence being obtained by associating each of a plurality of history patterns consisting of control information with a control plan for transmission, and controlling transmission based on the control plan identified with a history of the control information and the correspondence having the highest priority.

Advantageous Effects of Invention

According to the present invention, it is possible to appropriately control transmission for each pico base station while suppressing an increase in the amount of feed back information from a macro terminal to a macro base station and an increase in the amount of transmission control information from the macro base station to a pico base station in controlling transmission in the pico base station.

BRIEF DESCRIPTION OF DRAWINGS

FIG. 8 is a diagram showing an example of a group of strategies included in a pico station according to Embodiment 2 of the present invention.

DESCRIPTION OF EMBODIMENTS

Embodiments according to the present invention will be described below in detail with reference to the drawings. In the embodiments, identical configuration elements are assigned the same reference codes, and duplicate descriptions thereof are omitted.

Embodiment 1

An Outline of a System

Figure 1:
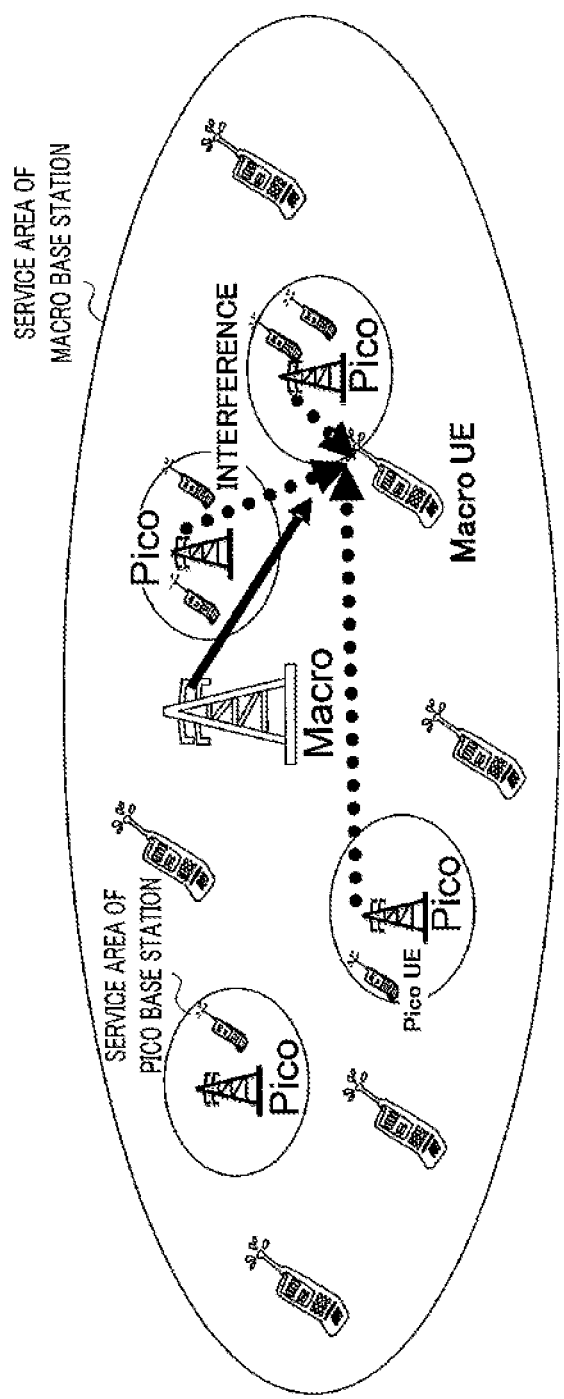
FIG. 1 is a diagram showing an example of a heterogeneous network.

A communication system according to the present embodiment includes base station 100, base station 200, and terminal 300. Base station 100 is, for example, a pico base station, another base station 200 is a macro base station, and terminal 300 is a macro terminal connected to another base station 200 (a macro base station). For example, a plurality of base stations 100 (a pico base station) are located in a service area covered by base station 200 (a macro base station) in a communication system according to the present embodiment as with FIG. 1. Base station 200 (a macro base station) is connected to each of a plurality of terminals 300 (a macro terminal).

Base station 100 and base station 200 share at least a part of frequency bands in the communication system according to the present embodiment. Thus, base station 100 and base station 200 may interfere with each other in a downlink channel.

A terminal (a pico terminal, not shown) connected to base station 100 (a pico base station) may receive interference from base station 200 (a macro base station) in a downlink channel. Terminal 300 (a macro terminal) may receive interference from base station 100 (a pico base station) in a downlink channel. Terminal 300 (a macro terminal) does not acquire all information on base station 100 (a pico base station) and only recognizes that "terminal 300 receives interference from somewhere."

Base station 200 (a macro base station) and base station 100 (a pico base station) are connected through a backhaul line (for example, a wired line such as an optical fiber, or a wireless line), and base station 200 (a macro base station) stores information on base station 100 (a pico base station) which may interfere with terminal 300 (a macro terminal) connected to base station 200.

In the above mentioned communication system, each terminal 300 (a macro terminal) generates feed back information indicating interference information on an interference value received in terminal 300 from the exterior and feeds back the feed back information to base station 200 (a macro base station).

Base station 200 (a macro base station) generates control information on interference among a plurality of terminals 300, using feed back information fed back from each of the plurality of terminals 300 connected to base station 200 (a plurality of terminals 300 which communicate with base station 200) and reports the control information to a plurality of base stations 100 (a pico base station) located in a service area of base station 200.

Each base station 100 (a pico base station) controls transmission therefrom based, on the control information reported from base station 200 (a macro base station).

Figure 2:
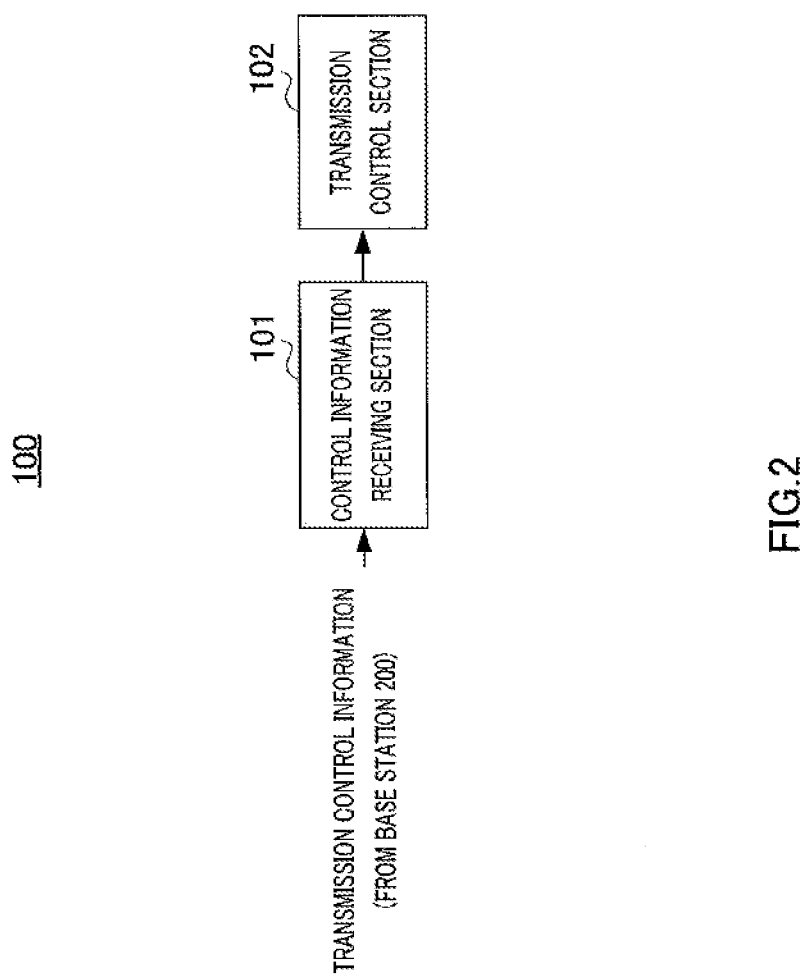
FIG. 2 is a diagram of main components of a base station (a pico base station) according to embodiment 1 of the present invention.

FIG. 2 is a diagram of main components of base station 100 according to Embodiment 1 of the present invention. In base station 100, control information receiving section 101 receives control information on interference among a plurality of terminals 300, from base station 200 which communicates with the plurality of terminals 300. Transmission control section 102 updates, based on the control information, a priority with respect to each of a plurality of different correspondences, each of the correspondences being obtained by associating each of a plurality of history patterns consisting of control information (, hereinafter referred to as, "control information history patterns") with a control plan for transmission. Transmission control section 102 controls transmission based on the control plan identified with the history of control information and a correspondence having the highest priority.

[The Configuration of Base Station 100]

Figure 3:
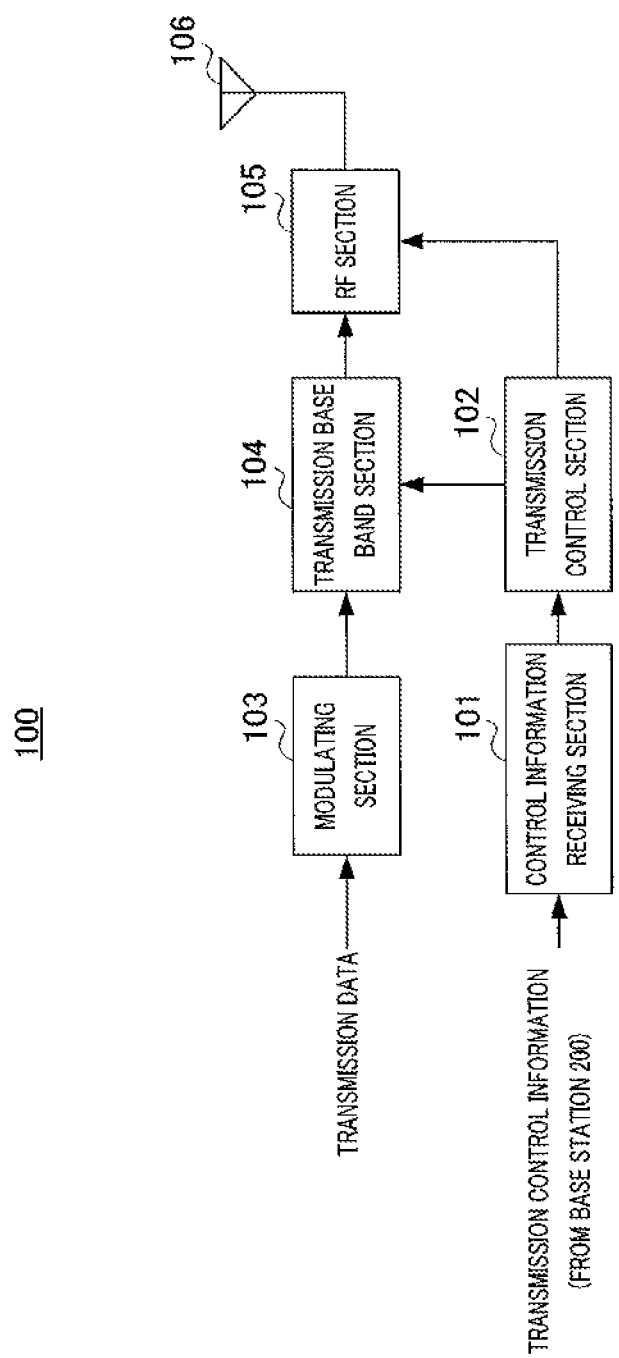
FIG. 3 is a block diagram showing components of a base station (a pico base station) according to Embodiment 1 of the present invention.

FIG. 3 is a block diagram showing components of base station 100 according to the present embodiment. Base station 100 is, for example, a pico base station. In FIG. 3, base station 100 includes control information receiving section 101, transmission control section 102, modulating section 103, transmission base band section 104, RF section 105, and antenna 106.

Control information receiving section 101 receives transmission control information reported from base station 200 through a backhaul line. The transmission control, information is reported from base station 200 which communicates with a plurality of terminals 300, and relates to interference in the plurality of terminals 300 described above. Control information receiving section 101 outputs the received transmission control information to transmission control section 102.

Transmission control section 102 determines a method of controlling transmission in base station 100 based on transmission control information inputted from control information receiving section 101. Transmission control section 102 controls transmission base band section 104 and RF section 105 in accordance with the determined method of controlling transmission. A process for controlling transmission in transmission control section 102 will be described in detail hereinafter.

Modulating section 103 modulates transmission data to a terminal (a pico terminal, not shown) connected to base station 100 and outputs the modulated transmission data to transmission base band section 104.

Transmission base band section 104 performs a transmission base band process on the transmission data inputted from modulating section 103 in accordance with an instruction from transmission control section 102 and outputs the transmission data subjected to the transmission base band process to RF section 105.

RF section 105 performs a transmission radio process (upconvert, digital-to-analog (D/A) conversion, or the like) on the transmission data inputted from transmission base band section 104 in accordance with an instruction from transmission control section 102, and transmits the transmission data subjected to the transmission radio process through antenna 106.

[The Configuration of Base Station 200]

Figure 4:
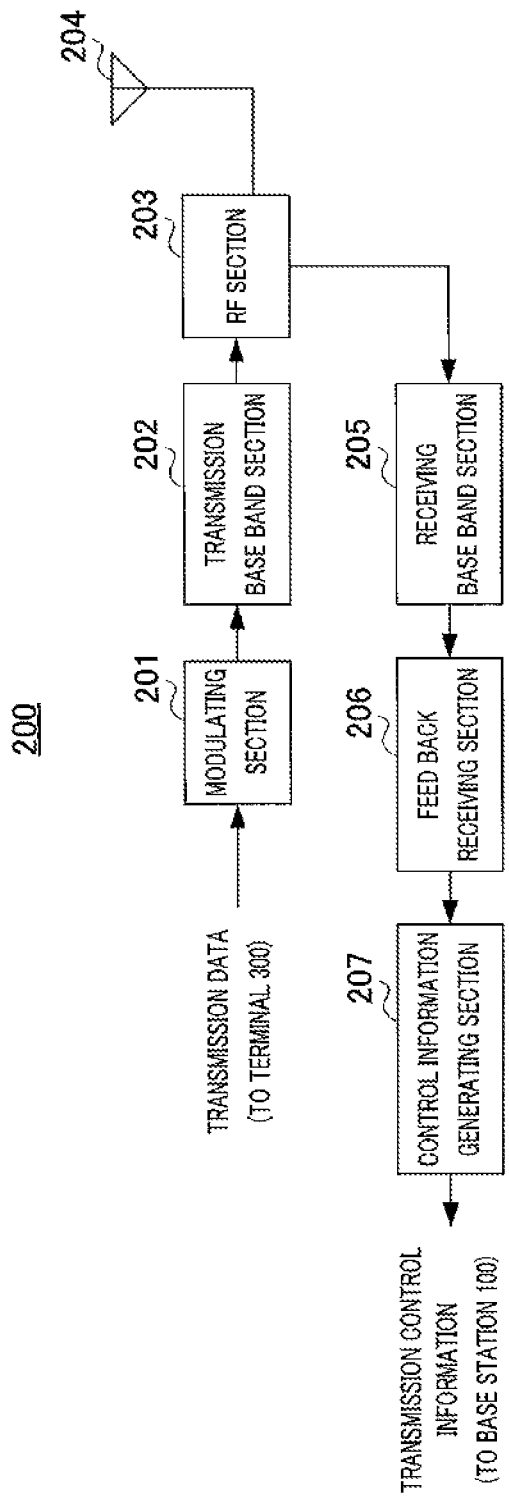
FIG. 4 is a block diagram showing components of another base station (a macro base station) according to Embodiment 1 of the present invention.

FIG. 4 is a block diagram showing components of base station 200 according to the present embodiment. Base station 200 is, for example, a macro base station. In FIG. 4, base station 200 includes modulating section 201, transmission base band section 202, RF section 203, antenna 204, reception base band section 205, feed back receiving section 206, and control information generating section 207.

Modulating section 201 modulates transmission data to terminal 300 (a macro terminal) connected to base station 200 and outputs the modulated transmission data to transmission base band section 202.

Transmission base band section 202 performs a transmission base band process on the transmission data inputted from modulating section 201 and outputs the transmission data subjected to the transmission base band process to RF section 203.

RF section 203 performs a transmission radio process on the transmission data (downlink data) inputted from transmission base band section 202 and transmits the transmission data subjected to the transmission radio process through antenna 204. RF section 203 performs a reception radio process (downconvert, analog-to-digital (A/D) conversion, or the like) on the signal received through antenna 204, and outputs the received signal subjected to the reception radio process to reception base band section 205. The signal received through antenna 204 includes feed back information fed back from each terminal 300 connected to base station 200 and transmission data to base station 200 (uplink data).

Reception base band section 205 performs a reception base band process on the received signal inputted from RF section 203 and outputs the signal subjected to the reception base band process to feed back receiving section 206.

Feed back receiving section 206 extracts feed back information from each terminal 300, from the signal inputted from reception base band section 205. Feed back receiving section 206 then outputs the extracted feed back information to control information generating section 207.

Control information generating section 207 generates transmission control information, using the feed back information inputted from feed back receiving section 206. For example, control information generating section 207 generates the transmission control information based on an interference value which is received in each terminal 300 and which is indicated in feed back information from each of a plurality of terminals 300. This transmission control information relates to interference among a plurality of terminals 300 (a plurality of terminals 300 which communicate with base station 200) connected to base station 200 and is represented by one bit. Control information generating section 207 reports the generated transmission control information to each base station 100 through a backhaul line. A process for generating control information in control information generating section 207 will be described in detail hereinafter.

[The Configuration of Terminal 300]

Figure 5:
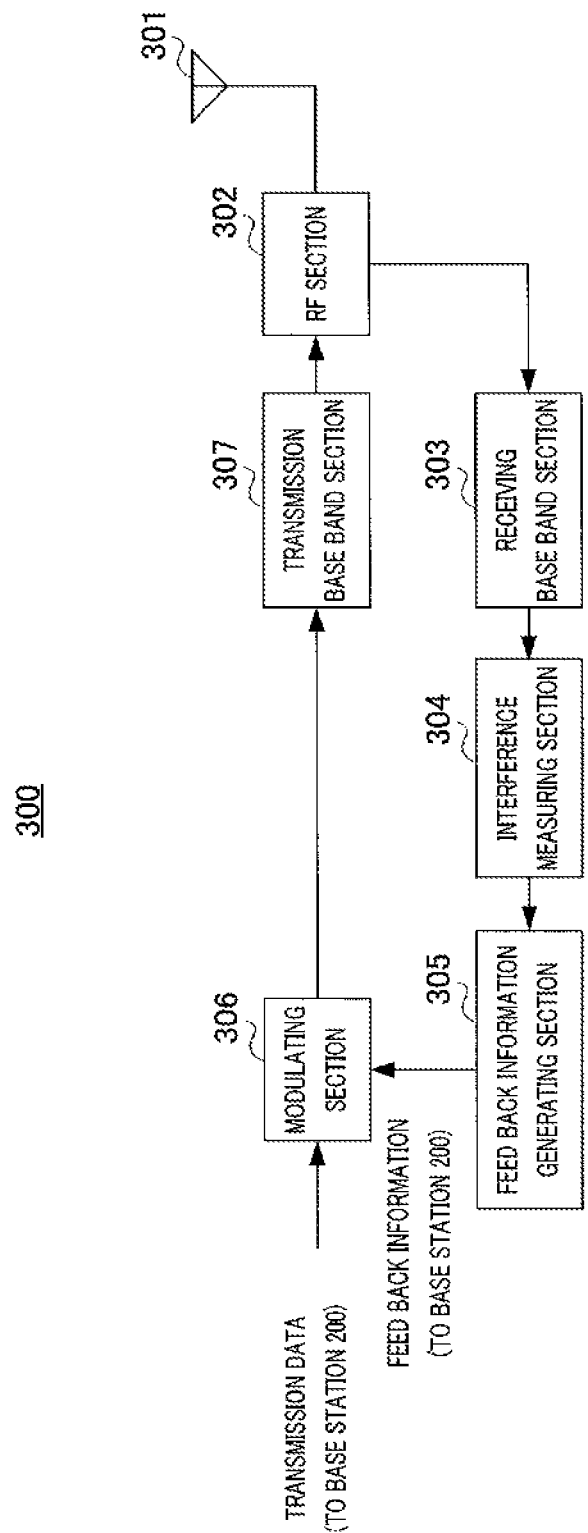
FIG. 5 is a block diagram showing components of a terminal (a macro terminal) according to Embodiment 1 of the present invention.

FIG. 5 is a block diagram showing components of terminal 300 according to the present embodiment. Terminal 300 is, for example, a macro terminal. In FIG. 5, terminal 300 includes antenna 301, RF section 302, receiving base band section 303, interference measuring section 304, feed back information generating section 305, modulating section 306, and transmission base band section 307.

RF section 302 performs a reception radio process on a signal received through antenna 301 and outputs the received signal subjected to the reception radio process to receiving base band section 303. The signal received through antenna 301 includes transmission data (downlink data, in other words, a desired signal) for terminal 300, which is transmitted from base station 200 connected to terminal 300 and a signal (i.e., an interference signal) from a plurality of base stations 100 located in the vicinity of terminal 300. RF section 302 performs a transmission radio process on the signal inputted from transmission base band section 307 and transmits the signal subjected to the transmission radio process through antenna 301.

Receiving base band section 303 performs a reception base band process on the received, signal inputted from RF section 302 and outputs the signal subjected to the reception base band process to interference measuring section 304.

Interference measuring section 304 detects an interference signal (i.e., a signal other than the signal from base station 200 (a desired signal)) from the signal inputted from receiving base band section 303 and measures power of the detected interference signal (interference power) as an interference value received in terminal 300. Interference measuring section 304 outputs the measured interference value to feed back information generating section 305.

Feed back information generating section 305 generates interference information on an interference value received in terminal 300, as feed back information to base station 200, based on the interference value inputted from interference measuring section 304. The interference information is represented by, for example, one bit. Feed back information generating section 305 outputs the generated feed back information to modulating section 306. A process for generating feed back information in feed back information generating section 305 will be described in detail hereinafter.

Modulating section 306 modulates transmission data (uplink data) for base station 200 (a macro base station) connected to terminal 300 and the feed back information inputted from feed back information generating section 305, and outputs the modulated signal to transmission base band section 307.

Transmission base band section 307 performs a transmission base band process on the signal inputted from modulating section 306 and outputs the transmission signal subjected to the transmission base band process to RF section 302.

[Operations of base station 100, base station 200, and terminal 300]

Operations of base station 100, base station 200, and terminal 300 as configured above will be described.

[Generation of Feed Back Information by Terminal 300]

A plurality of terminals 300 (macro terminals) connected to base station 200 (a macro base station) each generate interference information on an interference value received in each of the plurality of terminals 300 in a downlink channel, as feed back information every predetermined time. Specifically, feed back information generating section 305 generates interference information indicating whether or not interference values received in terminal 300 from a plurality of base stations 100 (for example, a total amount of interference power from the plurality of base stations 100) are within a predetermined value (hereinafter, referred to as an interference threshold), as feed back information.

For example, feed back information generating section 305 in i-th terminal 300 generates interference information $x\_i[k]$ =1 when an interference value received in terminal 300 at time k (a total amount of interference power from a plurality of base stations 100) exceeds the interference threshold. Meanwhile, feed back information generating section 305 in i-th terminal 300 generates interference information $x\_i[k]$ =−1 when the interference value received in terminal 300 at time k (a total amount of interference power from a plurality of base stations 100) is within the interference threshold. Then i-th terminal 300 feeds back generated interference information $x\_i[k]$(1 or −1) to base station 200 as feed back information. Accordingly, the amount of information equal to one bit is fed back from each terminal 300 to base station 200 at time k.

The interference threshold may be set by the specification in advance and may be separately reported from base station 200. For example, the most permissible interference value in terminal 300 may be set as the interference threshold. As described above, the interference value received in each terminal 300 may be the total value of interference (interference power) received from a plurality of base stations 100 (pico base stations), and terminal 300 need not store information on the plurality of base stations 100.

[Generation of transmission control information by base station 200]

Base station 200 (a macro base station) generates transmission control information common to the plurality of base stations 100, using feed back information $x\_i[k]$ fed back from each of a plurality of terminals 300 connected to base station 200.

Specifically, control information generating section 207 tallies feed back information $x\_i[k]$ from the plurality of terminals 300 (a plurality of terminals 300 which communicate with base station 200) connected to base station 200 at time k and calculates a rate of terminal 300 whose interference value exceeds the interference threshold (terminal 300 which feeds back $x\_i[k]$=1) to the number of all terminals.

Control information generating section 207 then generates transmission control information t[k] indicating whether or not the rate of terminal 300 in which an interference value exceeds the interference threshold is within a predetermined value (hereinafter, referred to as a permissible rate). Control information generating section 207 generates transmission control information $\mu[k]$=1 when the rate of terminal 300, in which the interference value exceeds the interference threshold, exceeds the permissible rate at time k, and generates transmission control information $\mu[k]$=−1 when the rate of terminal 300, in which the interference value exceeds the interference threshold, is within the permissible rate. In other words, the transmission control information indicates the rate of terminal 300 in which the interference value is within the interference threshold. To be more specific, the transmission control information indicates whether or not the rate of terminal 300, in which the interference value is within the interference threshold, is within the permissible rate.

Base station 200 broadcasts transmission control information $\mu[k]$(1 or −1) generated at time k to a plurality of base stations 100 through an interface between base stations such as a backhaul line. Accordingly, the amount of information on the transmission control information common to each base station 100 is one bit, the information being broadcasted from base station 200 to the plurality of base stations 100 at time k.

[Transmission Control in Base Station 100]

Each base station 100 controls transmission therefrom, using the transmission control information broadcasted from base station 200, based on a "strategy" individually set in each base station 100.

The "strategy" refers to the correspondence obtained by associating each of a plurality of pattern candidates of the history of control information (patterns of the result of received transmission control information for past several times, hereinafter referred to as, "control information history pattern candidate") with a control plan for transmission in base station 100. Specifically, the "strategy" can be represented by a table for mapping the type of an action when transmission control information $\mu[k]$(1 or −1) is received (a control plan for transmission).

Figure 6:
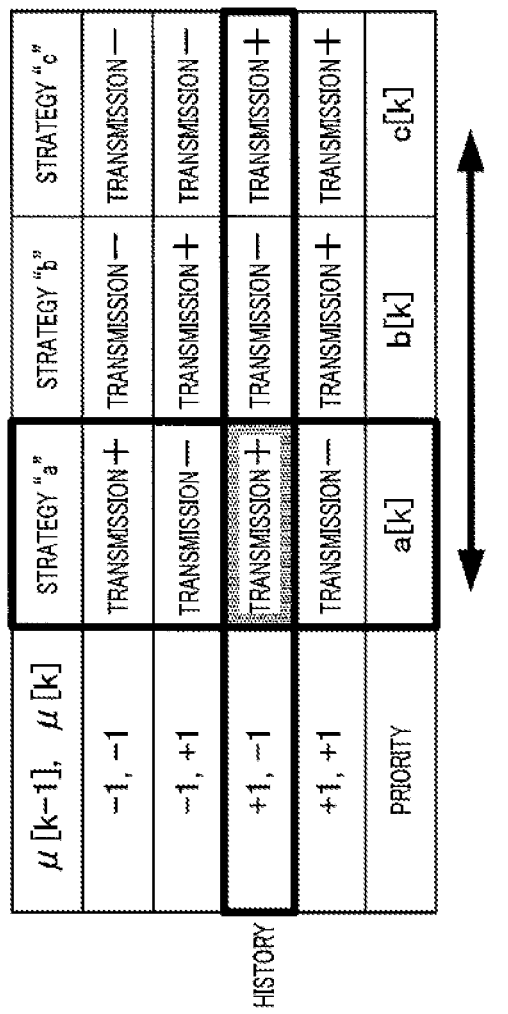
FIG. 6 is a diagram showing an example of a group of strategies included in the pico station according to Embodiment 1 of the present invention.

For example, FIG. 6 shows a table representing a "strategy" in certain base station 100. As shown in FIG. 6, each base station 100 has a group of strategies including a plurality of different strategies (three strategies including strategy "a," strategy "b," and strategy "c"). In each strategy shown in FIG. 6, four types of control information history pattern candidates (history length=2) are associated with respective control plans for transmission ("transmission+" or "transmission−"). The four types of pattern candidates each represent a pattern of the reception result of two past transmission control information values ($\mu[k−1]$ and $\mu[k]$) from base station 200, from the previous reception to the current reception. In other words, each "strategy" is represented by correspondences obtained by associating each of a plurality of control information history pattern candidates with a control plan for transmission, the control information history pattern candidates forming a group of control information history pattern candidates.

In the control plan for transmission, "transmission+" represents an operation for increasing transmission in base station 100, i.e., a transmission control for performing active transmission in base station 100. On the other hand, "transmission−" represents an operation for decreasing transmission in base station 100, i.e., a transmission control for performing a negative transmission in base station 100. Accordingly, the control plan for transmission represents an increase or a decrease in transmission in base station 100 (a transmission opportunity).

For example, the transmission control corresponding to "transmission+" (transmission control for active transmission in base station 100) involves increasing transmission power in base station 100 (a power control), increasing a transmission frequency (a frequency of subframe in which downlink data is transmitted) of downlink data in base station 100 (control in the time domain), increasing a frequency band (frequency resources) used for transmission in base station 100 (control in the frequency domain), or performing transmission in base station 100 (control in the spatial domain).

In contrast, the transmission control corresponding to "transmission−" (operation opposite to "transmission+", i.e., transmission control for negative transmission in base station 100) involves decreasing transmission power in base station 100 (a power control), decreasing a transmission frequency (a frequency of subframe in which downlink data is transmitted) of downlink data in base station 100 (control in the time domain), decreasing a frequency band (frequency resources) used for transmission in base station 100 (control in the frequency domain), or not performing transmission in base station 100 (control in the spatial domain).

A plurality of different strategies (a group of strategies) included in each base station 100 are generated in association with, for example, a cell ID unique to each base station. In other words, the content of a group of strategies (strategy "a", strategy "b", and strategy "c") shown in FIG. 6 (an operation corresponding to a reception result for two past transmission control information values) varies for each base station 100.

As shown in FIG. 6, a priority (priority a[k] for strategy "a," priority b[k] for strategy "b," and priority c[k] for strategy "c") is set to each of the plurality of different strategies included in each base station 100. Base station 100 selects a strategy having the highest priority at each time.

Transmission control section 102 in each base station 100 then controls transmission in base station 100 based on a control plan for transmission ("transmission+" or "transmission−") which is identified with the history of transmission control information received from base station 200 and a selected strategy (a strategy having the highest priority). Specifically, when a control information history pattern is represented by a predetermined number (for example, N, in other words, history length=2) of transmission control information values, transmission control section 102 updates the priority of each strategy based on transmission control information in current reception, and controls transmission in base station 100 based on a control plan identified with the history including N transmission control information values from reception N−1 times before to the current reception, and a strategy having the highest priority.

For example, a case will be described where transmission control information μ[k−1]=1 at time k−1, transmission control information μ[k]=−1 at time k, and priority a[k] in strategy "a" is the highest among strategies "a" to "c" at time k in base station 100 having a group of strategies (history length=2) shown in FIG. 6.

In this case, transmission control section 102 identifies "transmission+," i.e., a control plan for transmission corresponding to a control information history pattern candidate (μ[k−1]=1, μ[k]=−1) in strategy "a" as shown in FIG. 6. Accordingly, transmission control section 102 performs a transmission control which increases transmission in base station 100 at time k based on the identified control plan for transmission "transmission+" (i.e., a transmission control which actively performs transmission in base station 100).

Transmission control section 102 updates a priority in each of a plurality of different strategies, based on transmission control information transmitted from base station 200. To be more specific, each base station 100 determines whether or not the transmission control is correctly determined based on the control information history pattern at time k−1 and time k (i.e., a control plan for transmission identified at time k) in view of a system, using transmission control information μ[k+1] received at time k+1.

For example, a case will be described where a control information history pattern is (μ[k−1]=1, μ[k]=−1), base station 100 selects strategy "a" at time k, and transmission control information μ[k+1] reported from base station 200 at the next timing (at time k+1) is −1, as shown in FIG. 6 as with the above mentioned pattern. In this case, base station 100 learns the knowledge that "performing a transmission control "transmission+" (a transmission control for performing active transmission in base station 100) at time k in base station 100 is correct in a case where a control information history pattern is (μ[k−1]=1, μ[k]=−1)."

Transmission control section 102 then increases, by a predetermined amount, a priority of a strategy having a control plan for transmission "transmission+" corresponding to the control information history pattern candidate (μ[k−1]=1, μ[k]=−1). In contrast, transmission control section 102 decreases, by a predetermined amount, a priority of a strategy having a control plan for transmission "transmission−" corresponding to the control information history pattern candidate (μ[k−1]=1, μ[k]=−1). In FIG. 6, transmission control section 102 increases, by a predetermined amount, priority a[k+1] in strategy "a" actually selected at time k and increases, by a predetermined amount, priority c[k+1] in strategy "c" having a control plan for transmission "transmission+" corresponding to the control information history pattern candidate (μ[k−1]=1, μ[k]=−1), for example. On the other hand, transmission control section 102 decreases, by a predetermined amount, priority b[k+1] in strategy "b" having a control plan for transmission "transmission−" corresponding to the control information history pattern candidate (μ[k−1]=1, μ[k]=−1) in FIG. 6.

In other words, it can be said that "although base station 100 performs transmission control for actively performing transmission in base station 100 at time k based on strategy "a" (transmission control "transmission+"), the transmission control could maintain a result in which a rate of terminals having interference values exceeding an interference threshold to a plurality of terminals 300 connected to base station 200 is within a predetermined value (a permissible rate) (μ[k+1]=−1)" in the above described operation. Accordingly, it can be said that strategy "a" for base station 100 at time k is effective for an object "maximizing a transmission opportunity in base station 100 while suppressing interference to a plurality of terminals 300 connected to base station 200".

On the other hand, a case will be described where a control information history pattern is (μ[k−1]=1, μ[k]=−1), base station 100 selects strategy "a" at time k, and transmission control information μ[k+1] reported from base station 200 at the next timing (at time k+1) is 1, as shown in FIG. 6. In this case, base station 100 learns the knowledge that "performing a transmission control "transmission+" (a transmission control for performing active transmission in base station 100) at time k in base station 100 is wrong in a case where a control information history pattern is (μ[k−1]=1, μ[k]=−1)."

Transmission control section 102 then decreases, by a predetermined amount, a priority of a strategy having a control plan for transmission "transmission+" corresponding to the control information history pattern candidate (μ[k−1]=1, μ[k]=−1). In contrast, transmission control section 102 increases, by a predetermined amount, a priority of a strategy having a control plan for transmission "transmission−" corresponding to the control information history pattern candidate (μ[k−1]=1, μ[k]=−1). In FIG. 6, transmission control section 102 decreases, by a predetermined amount, priority a[k+1] in strategy "a" actually selected at time k and decreases, by a predetermined amount, priority c[k+1] in strategy "c" having a control plan for transmission "transmission+" corresponding to the control information history pattern candidate (μ[k−1]=1, μ[k]=−1), for example. In contrast, transmission control section 102 increases, by a predetermined amount, priority b[k+1] in strategy "b" having a control plan for transmission "transmission−" corresponding to the control information history pattern candidate (μ[k−1]=1, μ[k]=−1) in FIG. 6.

In other words, it can be said that "base station 100 performs transmission control for actively performing transmission in base station 100 at time k based on strategy "a" (transmission control "transmission+"), which is a part of the cause of a result in which a rate of terminals in which the interference values exceeds an interference threshold to a plurality of terminals 300 connected to base station 200 exceeds a predetermined value (a permissible rate) (μ[k+1]=1)" in the above described operation. Accordingly, it can be said that strategy "a" for base station 100 at time k is not effective for an object "maximizing a transmission opportunity in base station 100 while suppressing interference to a plurality of terminals 300 connected to base station 200" (i.e., this selection is wrong).

Transmission control section 102 in each base station 100 then controls transmission in base station 100 at time k+1 (not shown), based on a control plan for transmission which is identified with the control information history pattern (μ[k], μ[k+1]) and the strategy selected at time k+1 (a strategy having the highest priority). In view of the above, each base station 100 sequentially performs the above described transmission control and continues to update priorities of a plurality of different strategies in each base station 100.

Accordingly, each base station 100 (pico base station) continues to update a priority in each strategy, thereby identifying a strategy including a larger number of control plans for transmission effective for an object "maximizing a transmission opportunity in each base station 100 while suppressing interference to a plurality of terminals 300 (macro terminals) communicating with base station 200, for each of a plurality of control information history pattern candidates. Finally, a network is distributively and autonomously configured such that each base station 100 employs a unique strategy (a strategy appropriate for each base station 100).

Hereinafter, the above described operation performed in base station 100 will be described in view of another perspective.

(The target of transmission control in base station 100 according to the present embodiment is "maximizing the transmission opportunity of base station 100 while maintaining a rate of terminals which receive interference values exceeding an interference threshold (impermissible interference) among a plurality of terminals 300 connected to base station 200, less than or equal to a predetermined value (a permissible rate)." In other words, base station 100 performs transmission control "maximizing transmission opportunity in base station 100 while satisfying a restriction on interference among a plurality of terminals 300 connected to base station 200 (i.e., interference in a downlink channel).

For example, the literature, K. Yamamoto, K. Kimura, H. Murata, S. Yoshida, "Performance Evaluation of Minority Game-based Self-organized Interference Management," IEICE Technical Report, SR2009-106, March 2010 discloses that a method based on an idea of minority game (MG) can be effectively utilized for transmission control "maximizing the transmission opportunity in a base station while satisfying a restriction on a predetermined amount of interference." The literature differs from the above described operation in base station 100 according to the present embodiment in that "the literature does not target interference in a downlink channel" and "a base station does not broadcast transmission control information based on interference information fed back from a plurality of terminals.

In view of the above, according to the present embodiment, transmission control in each base station 100 (pico base station) is based on an idea of minority game shown in the above described literature. Accordingly, an effective transmission control can be achieved in view of a system in comparison with, for example, a case of randomly controlling transmission. Specifically, each base station 100 (pico base station) updates priorities of a group of strategies unique to each base station 100 (a plurality of different strategies) based on transmission control information and distributively and autonomously controls transmission (controls interference based on an idea of minority game). This allows, for example, a heterogeneous network to appropriately control transmission for each pico base station while reducing an increase in complexity in entire system in the transmission control for a plurality of pico base stations.

According to the present embodiment, each of a plurality of terminals 300 transmits interference information on an interference value received in each terminal 300 to base station 200, and base station 200 generates transmission control information based on interference information from each terminal 300. In this case, the interference information indicates whether or not the interference value received in terminal 300 is within an interference threshold (a predetermined value). The transmission control information indicates whether or not a rate of terminals 300 having the interference values less than or equal to an interference threshold is within a permissible rate (a predetermined value).

Thus, the amount of feed back information fed back from a plurality of terminals 300 connected to base station 200, to base station 200 is one bit for one terminal (one bit/terminal). The amount of transmission control information (information common to all base stations 100) reported from base station 200 to each base station 100 is one bit. In other words, base station 200 (macro base station) generates transmission control information of one bit common to all base station 100 (pico base station) based on feed back information of one bit from the plurality of terminals 300 (macro terminals). It is therefore possible to minimize (one bit) the amount of feed back information from terminal 300 (macro terminal) to base station 200 (macro base station) and the amount of transmission control information from base station 200 (macro base station) to base station 100 (pico base station) when controlling transmission in base station 100 (pico base station).

Terminal 300 (macro terminal) may measure only a total sum of interference (a total interference power) from base station 100 (pico base station), which enables measurement load in terminal 300 to be minimized.

According to the present invention, it is possible to appropriately control transmission for each pico base station while suppressing an increase in the amount of feed back information from a macro terminal to a macro base station and an increase in the amount of transmission control information from the macro base station to a pico base station in controlling transmission in the pico base station.

Embodiment 2

The basic structures of a base station (for example, a pico base station), base station (for example, a macro base station), and a terminal (for example, a macro terminal) according to the present embodiment are common, to Embodiment 1, and therefore these structures will be described with reference to FIGS. 3, 4, and 5.

The present embodiment differs from Embodiment 1 in that base station 200 reports a history length of transmission control information to be used for a strategy (the number of memory bits or a memory length) to base station 100 in addition to "transmission control information."

Specifically, control information generating section 207 generates transmission control information, using feed back information fed back from each of a plurality of terminals 300 (FIG. 5) in base station 200 (FIG. 4) according to the present embodiment, as with Embodiment 1. Control information generating section 207 further generates information on history length M of transmission control information to be used for a strategy in base station 100 (FIG. 3). This "history length M of transmission control information" is used for identifying a control plan for transmission in base station 100.

Herein, base station 200 (macro base station) acquires the approximate number of base stations 100 (pico base stations) which may interfere with terminal 300 (a macro terminal) connected to base station 200. Control information generating section 207 then determines history length M of transmission control information, depending on the number of base stations 100 (pico base stations) which may interfere with terminal 300 (a macro terminal) connected to base station 200. History length M varies depending on the number of base stations 100 in an area controlled by base station 200.

Control information generating section 207 then reports transmission control information μ[k] and information on history length M of transmission control information as information common to all of base stations 100.

Information on history length M may be previously reported from base station 200 to each base station 100 as common information, and need not be reported at the frequency similar to that of transmission control information μ[k] (information for each time k). For example, whereas base station 200 reports transmission control information μ[k] to each base station 100 approximately once a second, base station 200 may report information on history length M to each base station 100 approximately once a day. Although control information reported from base station 200 to each base station 100 increases by information on history length M, an increase in overhead related to a report for all control information can be almost ignored as compared to Embodiment 1.

On the other hand, control information receiving section 101 receives transmission control information μ[k] and information on history length M of transmission control information which are reported from base station 200, in base station 100 (FIG. 3) according to the present embodiment.

Transmission control section 102 then identifies a control plan for transmission based on a history of transmission control information corresponding to history length M and a strategy (a strategy having the highest priority).

In other words, each base station 100 identifies a unique strategy based on a preset history length (for example, history length equals 2 in FIG. 6) not depending on the number of base stations 100 which may interfere with terminal 300 connected to base station 200 in Embodiment 1. In contrast, each base station 100 identifies an unique strategy based on history length M depending on the number of base stations 100 which may interfere with terminal 300 connected to base station 200 in the present embodiment.

This is because transmission control in each base station 100 is based on an idea of minority game as mentioned above, and an effect of interference control based on the idea of minority game is thought to be decreased. This decrease is caused since an increase in the number of base stations 100, which may interfere with terminal 300 connected to base station 200, causes a plurality of base stations 100 to take a similar pattern of action (a control plan for transmission) in the time domain with a high probability, depending on history length M.

Specifically, as the number of base stations 100 which may interfere with terminal 300 connected to base station 200 increases, the plurality of base stations 100 take a similar pattern of action in the time domain with a high probability. In view of that above, subdividing a pattern of action in the time domain in base station 100 can reduce the above described probability. In other words, it is possible to subdivide a pattern of action in the time domain in base station 100 by increasing history length M of transmission control information used for a strategy in base station 100 (i.e., increasing the number of control information history pattern candidates forming a group of control information history pattern candidates) and generating different strategies between base stations 100 (for example, random strategies).

For example, when history length M=2 (for example, FIG. 6), patterns of action in the time domain (for example, at time k) in base station 100 are four types ($=2^2$ types). In contrast, when history length M=4, (not shown), patterns of action in the time domain (for example, at time k) in base station 100 are sixteen types ($=2^4$ types) and are subdivided as compared with a case where history length M=2. History length M used for a strategy in base station 100 needs to be increased with an increase in the number of base stations 100 which can interfere with terminal 300 connected to base station 200.

However, if history length M used for a strategy in base station 100 is too long, each base station 100 can obtain only an effect almost identical to an effect of randomly determining an action (a control plan for transmission) in base station 100, even if controlling transmission based on an idea of minority game. Thus, interference control in a system including base station 200 and a plurality of base stations 100 is not converged.

Accordingly, it can be said that appropriate history length M used for a strategy in base station 100 varies depending on the number of base stations 100 which may interfere with terminal 300 connected to base station 200.

Figure 7:
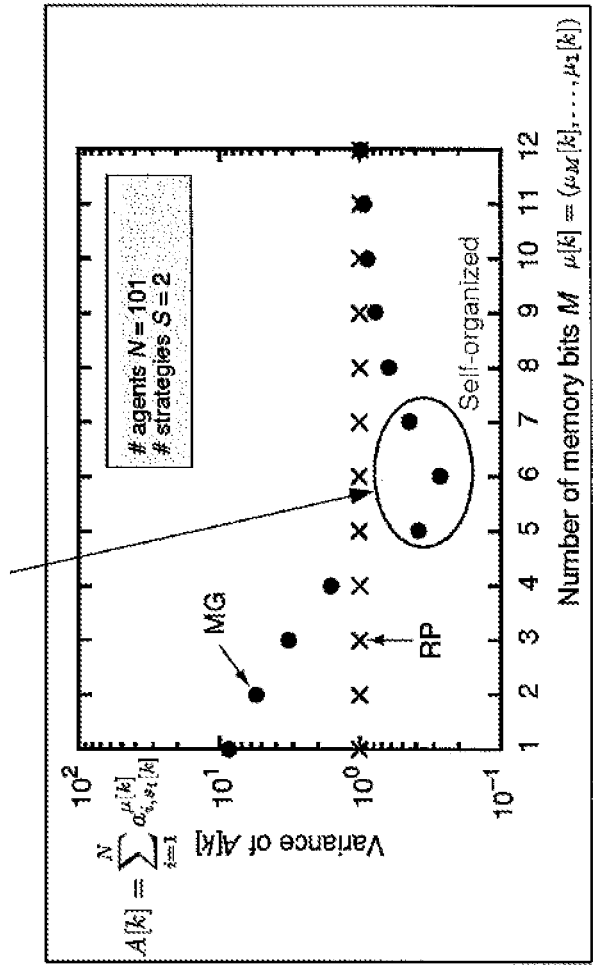
FIG. 7 is a diagram showing the result of computer simulation according to Embodiment 2 of the present invention.

The result of computer simulation performed by the present inventors shown in FIG. 7 shows that history length. M used for a strategy in base station 100 varies depending on the number of base stations 100 which may interfere with terminal 300 connected to base station 200. In the computer simulation shown in FIG. 7, the horizontal axis represents history length M (the number of memory bits) used for a strategy in a general minority game, and the vertical axis represents the variance of total sum A[k] of actions (the actions represented by +1 or −1 and corresponding to a control plan for transmission, i.e., "transmnission+" or "transmission−") in agents (corresponding to base stations 100). In the computer simulation shown in FIG. 7, number N of agents is one hundred and one, and number S of strategies included in each agent (base station 100) is two. In the computer simulation shown in FIG. 7, 'x' represents the result of control using random prediction (RP, i.e., each agent randomly selects +1 or −1 every time), and '•' represents the result of control using a general minority game (MG) and a state where a strategy (a strategy table) in each agent is sufficiently updated and converged in the minority game.

As shown in FIG. 7, focusing on the minority game, in a case where the number N of agent is one hundred and one, variance of total sum A[k] of actions of agents is minimum when history length M=6.

In the present embodiment, this means that variance of transmission control in each base station 100 is minimum when the number of base stations 100 (agents) which may interfere with terminal 300 connected to base station 200 is one hundred and one, a strategy of each base station 100 is sufficiently updated and converged, and base station 100 controls transmission (autonomous distributed control) using a strategy in which history length M=6. In other words, this means that controlling transmission using a strategy of history length M=6 allows each base station 100 to achieve a transmission control with less variance, in other words, a stable autonomous distributed control.

For example, FIG. 8 shows a table representing a strategy of history length M=6. In each strategy (strategies "a," "b," and "c") shown in FIG. 8, sixty-four types (=$2^6$ types) of control information history pattern candidates and control plans for transmission ("transmission+" or "transmission−") are associated with each other. The control information history pattern candidates are represented by reception results of six past transmission control information values from base station 200 ($\mu[k-5]$, $\mu[k-4]$ . . . , $\mu[k]$) from reception five times before to the current reception. In other words, the patterns of actions in the time domain in base stations 100 (for example, at time k) include sixteen-four types (=$2^6$ types) which correspond to reception results of six past transmission control information values, in a case where history length M=6 (FIG. 8).

Since base station 200 can acquire the approximate number of base stations 100 which may interfere with terminal 300 connected to base station 200, base station 200 may report information on optimal history length M identified depending on the number of base stations 100 as information common to each base station 100. Each base station 100, for example, may switch strategy tables used for transmission control in each base station 100 (for example, a plurality of strategy tables including FIG. 6 (tables corresponding to a case where history length M=2) and FIG. 8 (tables corresponding to a case where history length M=6), in accordance with information on history length M reported from base station 200.

This allows each base station 100 to use a strategy having optimal history length M, thereby making it possible to maximize an effect of transmission control (an interference control), based on an idea of a minority game.

According to the present invention, it is therefore possible to control transmission for each pico base station more accurately than Embodiment 1, while suppressing an increase in the amount of feed back information from a macro terminal to a macro base station and an increase in the amount of transmission control information from the macro base station to a pico base station in transmission control in the pico base station.

A method by which base station 200 (a macro base station) acquires the number of base stations 100 (pico base stations) which may interfere with terminal 300 (a macro terminal) connected to base station 200 includes the following examples. For example, the method includes a method by which base station 200 instructs terminal 300 to measure and report information on base station 100 which interferes with terminal 300 as necessary, or a method by which base station 200 recognizes an area having a high level of interference, from position information of terminal 300 reporting the reception of interference (i.e., an area to which base stations 100 are allocated) and deduces the number of base stations 100 from the degree of dispersion in the area.

Embodiments of the present invention have been described above.

OTHER EMBODIMENTS (1) The number of strategies (three in FIG. 6 and FIG. 8) included in each base station 100 (a pico base station) may vary in accordance with instruction from base station 200 (macro base station) in the above described Embodiments.

Figure 9:
FIG. 9 is a diagram showing an example of a group of strategies included in a pico station according to other Embodiments of the present invention.

(2) A so-called weighted table which changes a rate of control plan for transmission ("transmission+" and "transmission−") corresponding to each control information history pattern candidate for each strategy may be applied to the above mentioned Embodiments. In this weighted table, transmission controls (control plans for transmission) associated with control information history patterns are disproportionately set (disproportionately set to one of "transmission+" and "transmission−"). FIG. 9 shows an example of applying the weighted table to a strategy. In strategy "c" shown in FIG. 9, three types of control information history pattern candidates are associated with "transmission+," the remaining one type of control information history pattern is associated with "transmission−" among four types of control information history pattern candidates. In other words, "transmission+" is disproportionately set as a control plan for transmission in strategy "c" shown in FIG. 9 (weighted table).

It is assumed that, for example, the distribution of terminals 300 (macro terminals) connected to base station 200 (a macro base station) varies depending on a time zone, a day of the week or a place. For this reason, there may be a time zone (a day of the week, or a place) at which certain base station 100 (pico base station) does not interfere with a rate of terminals in which the interference value exceeds a permissible value (an interference threshold) regardless of the presence or absence of the transmission in base station 100. During the above described time zone (day of the week, or place), base station 100 preferably controls transmission so as to actively perform the transmission in base station 100 (i.e., "transmission+" in transmission control). During the above described time zone (day of the week or place), for example, a weighted table such as strategy "c" shown in FIG. 9 is preferably applied to base station 100.

In other words, the update is assumed to be not performed so as to increase the priority of a strategy in which control plans for transmission are disproportionately set to "transmission+", during a time zone at which terminal 300 is present in a range in which terminal 300 receives interference from base station 100 (a time zone at which transmission in base station 100 should be reduced). In contrast, the priority of a strategy, in which control plans for transmission are disproportionately set to "transmission+", is assumed to be increased, during the time zone at which terminal 300 is not present in a range in which terminal 300 receives interference from base station 100. In other words, base station 100 generates the above weighted table and appropriately updates the priority of a strategy, thereby enabling autonomous distributed transmission control optimal to the time zone.

Base station 100, for example, may switch tables representing strategies between a weighted table and a normal table (for example, a table including equally allocated "transmission+" and "transmission−") depending on a time zone. For example, base station 100 may uses the normal table in the day time and use the weighted table at night. Alternatively, base station 100 may switches tables representing strategies between a weighted table and a normal table, depending on the number of terminals 300 when base station 100 can acquires the approximate number of terminals 300 in a range in which base station 100 may interfere.

(3) In the above described Embodiments, signals related to broadcast may be ignored in this transmission control in which base station 100 (pico base station) selects one of control plans for transmission ("transmission+" and "transmission−"). For example, only data signals transmitted from base station 100 is used as a target for the transmission control. This allows a cell radius of an area covered by base station 100 (a pico base station) to be stable, and it is therefore possible to further efficiency perform autonomous distributed control in base station 100.

(4) In the above mentioned Embodiments, a case has been described where feed back information fed back from terminal 300 to base station 200 is one bit, and transmission control information reported from base station 200 to base station 100 is one bit. However, feed back information fed back from terminal 300 or transmission control information reported from base station 200 is not limited to one bit, but may be represented by two or more bits. This allows the interference value in terminal 300 to be fed back with higher accuracy. Base station 100 can identify a state of interference among a plurality of terminals 300 connected to base station 200 with higher accuracy.

(5) In the above embodiments, cases have been described by way of example in which the present invention is configured as hardware, but it is also possible for the present invention to be implemented by software.

Furthermore, each function block employed in the above descriptions of embodiments may typically be implemented as an LSI constituted by an integrated circuit. These may be implemented individually as single chips, or a single chip may incorporate some or all of the function blocks "LSI" is adopted herein but this may also be referred to as "IC," "system LSI," "super LSI," or "ultra LSI" depending on differing extents of integration.

Further, the method of circuit integration is not limited to LSI's, and implementation using dedicated circuitry or general, purpose processors is also possible. After LSI production, utilization of an FPGA (Field Programmable Gate Array) or a reconfigurable processor where connections and settings of circuit cells in an LSI can be reconfigured may also be possible.

In the event of the introduction of a circuit implementation technology whereby LSI is replaced by a different technology, which is advanced in or derived from semiconductor technology, integration of the function blocks may of course be performed using technology therefrom. An application to biotechnology and/or the like is also possible.

INDUSTRIAL APPLICABILITY

The present invention is useful for a pico base station/a femto base station or the like introduced in a heterogeneous network.

REFERENCE SIGNS LIST

100 Base station
101 Control information receiving section
102 Transmission control section
103, 104, 306 Modulating section
104, 202, 307 Transmission base band section
105, 203, 302 RF section
106, 204, 301 Antenna
200 Base station
205, 303 Receiving base band section
206 Feed back receiving section
207 Control information generating section
300 Terminal
304 Interference measuring section
305 Feed back information generating section

The invention claimed is:

1. A pico base station apparatus comprising: a receiving section that wirelessly receives, from a macro base station apparatus communicating wirelessly with a plurality of macro terminal apparatuses, transmission control information representing an increase or a decrease in wireless transmission in the pico base station and indicating whether a rate of macro terminal apparatus in which an interference value exceeds a first threshold with respect to among the plurality of macro terminal apparatuses, is within a second threshold or not; and a control section that updates a priority in each of a plurality of strategies based on the transmission control information, each strategy being correspondence obtained by associating each of a plurality of pattern candidates of history of the received transmission control information with a control plan for transmission, and controls the transmission using the control plan that is associated identified with the history of the received transmission control information and that is included in the strategy having the highest priority, wherein the control section increases the priority of the strategy having a control plan that is associated with the history in the last transmission and that is same as the control plan used in the last transmission when the transmission control information received at a current reception indicates that the rate is within the second threshold, and the control section decreases the priority of the strategy having a control plan that is associated with the history in the last transmission and that is same as the control plan used in the last transmission when the transmission control information received at a current reception indicates that the rate exceeds the second threshold.

2. The base station apparatus according to claim 1, wherein:
each of the plurality of pattern candidates of history the received transmission control information is represented by a pattern consisting of N transmission control information values from reception (N−1) times before to the current reception, where N is an integer.

3. The base station apparatus according to claim 1, wherein:
the terminal apparatus transmits interference information indicating an interference value received in each of the plurality of terminal apparatuses to the other base station apparatus; and the transmission control information is generated in the other base station apparatus based on the interference information.

4. The base station apparatus according to claim 3, wherein the interference information is represented by one bit.

5. The base station apparatus according to claim 1, wherein the transmission control information is represented by one bit.

6. The base station apparatus according to claim 1, wherein the control plan indicates a decrease or an increase in the transmission.

7. The base station apparatus according to claim 1, wherein the control plan indicates an increase or a decrease in transmission power for the transmission, an increase or a decrease in a time resource used for the transmission, an increase or a decrease in a frequency resource used for the transmission, or execution of the transmission.

8. The base station apparatus according to claim 1, wherein the receiving section receives information on a history length of the pattern candidates used for identifying the control plan from the other base station apparatus; and
the control section identifies the control plan from the history of the received transmission control information corresponding to the history length, and the strategy having the highest priority.

9. The base station apparatus according to claim 8, wherein the history length varies depending on a number of base station apparatuses in an area of the other base station apparatus.

10. The base station apparatus according to claim 8, wherein the history length is determined depending on a number of base station apparatuses in an area of the other base station apparatus.

11. A method of controlling transmission in a pico base station apparatus, the method comprising: receiving wirelessly, from a macro base station apparatus communicating wirelessly with a plurality of macro terminal apparatuses, transmission control information representing an increase or a decrease in wireless transmission in the pico base station and indicating whether a rate of macro terminal apparatus in which an interference value exceeds a first threshold with respect to among a the plurality of macro wireless terminal apparatuses, is within a second threshold or not; and updating a priority in each of a plurality of strategies based on the transmission control information, each strategy being correspondence obtained by associating each of a plurality of pattern candidates of history of the received transmission control information with a control plan for the transmission, and controlling the transmission using the control plan that is associated with the history of the received transmission control information and that is included in the strategy having the highest priority, wherein the priority of the strategy having a control plan that is associated with the history in the last transmission and that is same as the control plan used in the last transmission is increased when the transmission control information received at a current reception indicates the rate is within the second threshold, and the priority of the strategy having a control plan that is associated with the history in the last transmission and that is same as the control plan used in the last transmission is decreased when the transmission control information received at a current reception indicates the rate exceeds the second threshold.

* * * * *